3,761,235
MARBLE-LIKE GLASS MATERIAL AND METHOD OF PRODUCING THE SAME

Toshio Yamanaka and Shigeji Nakamura, Otsu, Japan, assignors to Nippon Electric Glass Company, Limited, Tokyo, Japan
No Drawing. Filed Jan. 20, 1971, Ser. No. 108,191
Claims priority, application Japan, Jan. 20, 1970, 45/4,903; Dec. 14, 1970, 45/110,494
Int. Cl. C03f 29/00
U.S. Cl. 65—33                                  8 Claims

ABSTRACT OF THE DISCLOSURE

A marble-like glass material comprises more than 90% calcium oxide, aluminum oxide and silicon dioxide, the material including 15–40% CaO, 3–35% $Al_2O_3$ and 40–75% $SiO_2$.

---

The present invention relates to a marble-like glass material produced by the crystallization of glass.

Natural marble is a beautiful building material but it is very expensive. Moreover, it is very difficult to obtain marble blocks of good quality in all desired shapes and sizes. Furthermore, natural marble has poor acid and weather resistance so that its beautiful surface deteriorates over the years.

It is a primary object of this invention to provide a marble-like building material which is highly resistant to corrosion and adverse weather conditions but which has the approximate surface appearance of natural marble.

We have accomplished this object by the crystallization of a certain type of glass, and have also provided a method for preventing the material from deforming during the heat treatment.

While many substances have been used as nucleating agents for the crystallization of glass compositions, no composition of glass formers has been proposed heretofore which exhibit a marble-like appearance when crystallized.

According to this invention, the glass formers CaO-$Al_2O_3$-$SiO_2$ are melted together without a nucleating agent, and the resultant glass composition is reheated to obtain a material of marble-like appearance. Since the melt of these conventional glass formers has the same viscosity as conventional glass compositions, glass plates and like bodies may be formed from these compositions by conventional glass forming techniques. The acid and weather resistance of the resultant material is similar to that of conventional plate glass.

The following table shows specific examples of compositions within the range of the present invention to form glass materials having the appearance of marble.

TABLE 1.—(PERCENT BY WEIGHT)

|  | No. 1 | No. 2 | No. 3 | No. 4 | No. 5 |
|---|---|---|---|---|---|
| CaO | 32.5 | 30.0 | 25.0 | 28.6 | 23.0 |
| $Al_2O_3$ | 10.0 | 20.0 | 10.0 | 4.8 | 10.0 |
| $SiO_2$ | 57.5 | 50.0 | 65.0 | 61.9 | 60.0 |
| $Na_2O$ |  |  |  | 4.7 |  |
| Total | 100.0 | 100.0 | 100.0 | 100.0 | 100.0 |

|  | No. 6 | No. 7 | No. 8 | No. 9 | No. 10 |
|---|---|---|---|---|---|
| CaO | 28.1 | 28.0 | 30.0 | 32.5 | 32.5 |
| $Al_2O_3$ | 9.4 | 10.0 | 10.0 | 10.0 | 10.0 |
| $SiO_2$ | 56.2 | 60.0 | 55.0 | 57.4 | 57.4 |
| $K_2O$ | 1.6 |  |  |  |  |
| BaO | 4.7 |  |  |  |  |
| ZnO |  | 2.0 |  |  |  |
| $B_2O_3$ |  |  | 5.0 |  |  |
| CoO |  |  |  | 0.1 |  |
| CuO |  |  |  |  | 0.1 |
| Total | 100.0 | 100.0 | 100.0 | 100.0 | 100.0 |

The glass formers are mixed in the manner conventional in glass manufacturing. Referring specifically to Example No. 1, for instance, to illustrate the manufacture, 100 grams of a glass composition are prepared by mixing 57.8 g. of sand (silica), 15.3 g. of aluminum hydroxide and 58.8 g. of calcium carbonate. This batch is melted for four hours at a temperature above 1450° C. in a crucible, a pot furnace or a tank furnace. The molten glass composition mixture is passed between rollers or pressed after pouring it into a mold to produce a plate-like body of glass, whereafter the glass body is annealed in the conventional manner.

Subsequently, the annealed glass body is subjected to a controlled heat treatment comprising a first heating stage wherein the temperature is raised from ambient (room) temperature to 700° C. at a rate at or below 300° C./hour, i.e. at a rate above 100° C./hour from the point of view of heat economy. Subsequently, the glass body is heated in a second heating stage from 700° C. to 1200° C. at a rate of about 120° C. to 130° C./hour, being heated at 1200° C. for one hour.

The first heating stage causes no transition in the glass. While rapid heating may be preferred from the point of view of heat economy, the heating rate is held to a maximum of 300° C./hour to prevent breaking of the glass body.

The glass is crystallized during the second heating stage. Above 1000° C., crystal growth begins from the surface of the glass body inwardly, proceeding slowly as the heat treatment continues. By maintaining the body for one hour at a temperature of 1200° C., the entire glass body is transformed into an aggregate of large crystals.

During the crystallization period in the second heating stage, the glass body has a hard, crystallized outside portion and a soft, non-crystallized inside portion, with the crystallized glass portion increasing inwardly as the non-crystallized portion recedes. Since the non-crystallized portion is relatively soft, there is a risk of deformation of the body during this heating stage. If the heating rate during this stage were in excess of 130° C./hour, the viscosity of the glass composition would be remarkably lowered in the non-crystallized portion, which would produce deformation.

X-ray diffraction has shown that the crystal phase of the glass body produced by the heat treatment is beta-wollastonite, and that the crystal size reaches up to about three millimeters in the longitudinal dimension of the crystals.

When the above-described crystallized glass material is polished, it assumes the appearance of natural marble, with semi-transparent and colorless portions as well as opaque and white portions. Assuming that the glass body of the indicated composition and subjected to the described heat treatment is produced by the float process, for instance, little polishing will be required to obtain the beautiful surface appearance desired.

The marble-like appearance of the glass material will be obtained if the crystals of the material have a minimum length of one millimeter. Crystal sizes in this range are readily obtained by the heat treatment of the present invention because the crystals develop mainly on a small number of nuclei formed on the surface of the glass body.

The following table shows a comparison of some essential physical characteristics of natural marble and the marble-like glass of this invention:

TABLE 2

|  | Bending strength (kg./sq. cm.) | Moh's hardness | Acid resistance | Thermal shock test |
|---|---|---|---|---|
| Example No. 1 | 500 | 6.5 | No blistering | No crack. |
| Natural marbles | 100–250 | 3 | Blistering | Do. |

The bending strength was measured with plates of 10 x 15 x 100 mm. size by a three-point loading method. The acid resistance was determined by visual inspection after soaking the plates for 24 hours in 5% hydrochloric acid at ambient (room) temperature. The thermal shock test was carried out by quenching the plates in cooling water after they had been removed from a furnace maintained at a temperature of 400° C.

As Table 2 indicates, the marble-like glass of the present invention, is superior, or at least equal, to the essential physical properties of natural marble.

As far as the percentage ranges of the essential components of the glass composition are concerned, we have found that such compositions do not properly crystallize if the CaO content is below 15% and the $SiO_2$ content is above 75% because of the stability of such compositions. On the other hand, if the calcium oxide content rises above 40% and the aluminum oxide content is below 3%, the composition is readily devitrified during the glass formation. Thus, glass compositions outside the stated component percentage ranges do not produce a glass of marble-like appearance. Also, if the three essential glass formers, i.e. CaO, $Al_2O_3$, and $SiO_2$, constitute less than 90% of the total weight of the composition, the glass will be deformed during the heating and/or the formed glass body will not have the appearance of marble.

It has been found to be advantageous to add to the composition a small amount of an oxide such as $Na_2O$, $K_2O$, $B_2O_3$ and like oxides.

If white marble is desired, no coloring component is added to the composition. On the other hand, if it is desired to produce colored marble-like materials, a small amount, i.e. about 0.05% to 4.0%, by weight, of an oxide pigment is added to the composition, such as ferric oxide ($Fe_2O_3$), cobalt oxide (CoO) or nickel oxide (NiO).

Moreover, the mechanical strength of the marble-like materials will be improved if, before the heat treatment, such insoluble particles as alumina ($Al_2O_3$) and zirconia ($ZrO_2$) are added to the composition.

The glass body formed from the glass composition of the present invention is transformed into an aggregate of relatively large crystals during the reheating stage without the addition of nucleating agents to the composition. Since the glass body is heated during this stage above the transition temperature, it is subject to the risk of deformation. However, if the rate of crystal growth from the surface inwardly is sufficiently rapid, at the temperature of deformation of the glass, the entire glass body may be crystallized without deformation even if a molten glass portion is present in the interior of the body since the crystallized outside portion is hard enough to prevent deformation. However, if the glass composition contained components for accelerating crystallization, such crystallization may take place during the glass forming step, which is undesirable. Therefore, no such components should be added to the composition.

According to one feature of this invention, glass deformation during the heat treatment of the glass body may be further inhibited by applying high refractory powders, such as alumina or zirconia, to the surface of the formed glass body before it is subjected to the second or reheating stage. In this manner, the crystal growth on the surface of the body is accelerated and the body surface is rapidly hardened sufficiently to prevent deformation. The refractory powder is preferably applied over the entire surface of the formed glass body in the form of an aqueous paste or the like, rather than in powder form, so as to provide good contact between the glass surface and the powder as the glass body is subjected to reheating.

After the coated glass body has been reheated in the above-described stages and crystallization has been completed, it is slowly cooled down within the furnace. The alumina or zirconia layer remaining on the surface of the body is then removed, and the surface of the crystallized glass body is polished to obtain the marble-like surface appearance.

We claim:

1. A method of producing a marble-like glass body, comprising the steps of forming a glass body from a molten mixture of 15% to 40% CaO, 3% to 35% $Al_2O_3$ and 40% to 75% $SiO_2$, the three oxides forming more than 90% of the mixture, all percentages being by weight, subjecting the glass body to a first heating stage wherein the temperature is raised to about 700° C. at a rate not exceeding 300° C./hour, and the heated body is then subjected to a second heating stage from 700° C. to 1200° C. at a rate of about 120° C. to 130° C./hour, the body being heated at 1200° C. for about one hour until it has been entirely crystallized to β-wollastonite phase having crystal size up to about three millimeters in longitudinal dimension of the crystals.

2. The method of claim 1 wherein heating of the glass body in the first heating stage causes no transition in the glass body.

3. The method of claim 1 wherein the molten mixture contains about 0.05% to 4.0% by weight of an oxide pigment selected from the group consisting of ferric oxide, cobalt oxide and nickel oxide.

4. The method of claim 1 wherein the molten mixture contains up to 5.0% by weight of an oxide selected from the group consisting of $Na_2O$, $K_2O$ and $B_2O_3$.

5. The method of claim 1 wherein the heated body is subjected to the second heating stage until it has been entirely crystallized to β-wollastonite phase consisting of crystals having a minimum length of about one millimeter in the longitudinal dimension of the crystals.

6. The method of claim 1, wherein the glass body is coated with a high refractory powder before being subjected to the heating stages.

7. The method of claim 6 wherein the powder is selected from the group consisting of alumina and zirconia.

8. The product prepared by the method of claim 1.

References Cited
UNITED STATES PATENTS

| | | | |
|---|---|---|---|
| 3,282,711 | 11/1971 | Lin | 65—33 X |
| 3,279,931 | 10/1966 | Olcott | 65—33 X |
| 3,218,262 | 11/1965 | De Lajarte | 65—33 X |
| 3,220,915 | 11/1965 | Shannon | 65—33 X |
| 3,241,935 | 3/1966 | Stookey | 65—33 |
| 3,524,738 | 8/1970 | Grubb | 65—33 X |
| 3,531,303 | 9/1970 | Bahat | 65—33 X |
| 1,893,382 | 1/1933 | Watson | 65—33 X |
| 2,932,922 | 4/1960 | Mauritz | 65—33 X |

OTHER REFERENCES

Handbook of Glass Manufacture, vol. II, pp. 192–199.

FRANK W. MIGA, Primary Examiner

U.S. Cl. X.R.

65—19